US006594534B1

(12) United States Patent
Crowell

(10) Patent No.: US 6,594,534 B1
(45) Date of Patent: Jul. 15, 2003

(54) MESSAGE RECORDING AND TRANSFER SYSTEM AND DOCKING STATION

(76) Inventor: Christopher S. Crowell, 80 Plains Rd., Essex, CT (US) 06426

(*) Notice: Subject to any disclaimer, the term of this patent is extended or adjusted under 35 U.S.C. 154(b) by 0 days.

(21) Appl. No.: 09/500,760

(22) Filed: Feb. 8, 2000

Related U.S. Application Data

(60) Provisional application No. 60/119,652, filed on Feb. 11, 1999.

(51) Int. Cl.[7] .......... G06F 17/00

(52) U.S. Cl. .......... 700/94; 709/105

(58) Field of Search .......... 700/94; 709/105; 379/88.13

(56) References Cited

U.S. PATENT DOCUMENTS

| | | | | | |
|---|---|---|---|---|---|
| 5,732,216 | A | * | 3/1998 | Logan et al. | 704/201 |
| 5,751,816 | A | * | 5/1998 | Howard | 381/101 |
| 5,870,549 | A | * | 2/1999 | Bobo, II | 348/14.01 |
| 6,052,442 | A | * | 4/2000 | Cooper et al. | 379/88.19 |
| 6,252,588 | B1 | * | 6/2001 | Dawson | 345/752 |

* cited by examiner

*Primary Examiner*—Leo Picard
*Assistant Examiner*—Kidest Bahta
(74) *Attorney, Agent, or Firm*—Melvin I. Stoltz

(57) ABSTRACT

By providing a recording/transfer system and docking station which is constructed to enable messages to be recorded, played, re-recorded, and then used, when perfected, to product a high quality audio signal which is transferrable to a one-time programmable audio generating circuit/module, an easily employed audio recording system is attained which is capable of being used by the consumer for recording perfected messages onto one or a plurality of one-time recordable audio generating modules. In the preferred construction, the record/transfer system and docking station is small and compact, thereby providing complete portability thereto and substantially enhancing its use and benefits. The record/transfer system and docking station of the present invention can be interconnected with a single, one-time programmable audio generating module, or, alternatively can be constructed for receiving a plurality of one-time programmable audio generating modules. Furthermore, an adapter or interface can be employed for interconnecting between the record/transfer system and docking station and the one-time programmable circuit/modules.

21 Claims, 12 Drawing Sheets

MESSAGE RECORDING AND TRANSFER SYSTEM AND DOCKING STATION

RELATED APPLICATIONS

This application is related to U.S. Provisional Patent Application Ser. No. 60/119,652, filed Feb. 11, 1999 entitled One-Time Programmable Audio Delivery System and Docking Station.

TECHNICAL FIELD

This invention relates to audio message recording and transferring systems and, more particularly to a portable recording/transfer system and docking station enabling interconnection with one or a plurality of message delivery chips or circuits.

BACKGROUND ART

During the last decade, substantial attention and interest has been paid to audio generating circuits which are capable of delivering a single message when activated. These integrated circuits have gained substantial popularity for business applications and consumer applications. For many years, such audio generating chips have been incorporated into greeting cards, calendars, picture frames, and the like, to produce a particular message or song each time the circuit is activated.

Although these audio delivery circuits have become increasingly popular and have been widely used in various applications, the broad, all-inclusive, acceptance and use of the circuits has been hampered by the cost of production and the limitations in self-generated audio. In particular, these circuits have been comparatively expensive to create and produced, particularly when a high quality of sound reproduction is sought.

In addition, in order to expand the use and acceptance of the these integrated circuits, re-programmable chips have been employed along with single use programmable chips. By employing these systems, consumers are able to place any desired message on the chip prior to delivery of a desired product with the circuit to an end user.

Although a wide variety of applications exist in which purchasers could impart a message onto a chip, either as a re-programmable chip or as a one time programmable chip, consumers have been reluctant to employ these circuits. Although many reasons may be given, most consumers avoid the use of these products since consumers are unable to perfect a particular message prior to recording the message on the circuit.

Another area in which prior art systems have been incapable of providing a satisfactory solution is in the production of audio delivery circuits used by small companies or businesses. In this regard, many smaller companies desire to produce or employ an audio delivery circuit which is distributed to many customers, with each circuit containing an identical message. However, in spite of this need, no prior art system has been capable of providing an economically produced product capable of recording a single message and transferring that message to a plurality of one-time programmable chips.

In addition, most prior art systems, also suffer from the common failing of being able to place an audio message on a one-time programmable chip directly, requiring the chip to be manually mounted after recording to a printed circuit board for being employed in the desired manner. This handling is not only costly but also potentially harmful to the chip, often resulting in damage being caused to the chip during the transfer and mounting operation.

Finally, prior art systems have been completely incapable of producing any type of message recording or transfer system which is sufficiently small and compact to provide portability. As a result, large immovable structures or computers are employed for creating a particular message and transferring that message to a recordable chip. Although such prior art systems may be effective, the systems prevent individuals and small businesses from having the substantial advantages provided by a system which is portable.

Therefore, it is a principal object of the present invention to provide a hand-holdable, portable message recording/transfer system capable of producing a high quality message which can be transferred to one or more audio delivery programmable chips or audio delivery circuits.

Another object of the present invention is to provide a portable message recording/transfer system having the characteristic features described above which enables the user to re-record any desired message to assure its perfection prior to its use and/or transfer.

Another object in the present invention is to provide a portable message recording/transfer system having the characteristic features described above which is capable of being programmed with a desired message by receiving either analog or digital inputs.

Another object of the present invention is to provide a portable message recording/transfer system having the characteristic features described above which is capable of simultaneously delivering a single recorded message to one or a plurality of audio delivery, programmable chips/circuits.

A further object of the present invention is to provide one-time programmable audio delivery circuits which are capable of being programmed by a user in a manner which assures that the message recorded onto the single use circuit or circuits is perfected prior to recording.

Another object of the present invention is to provide one-time programmable audio delivery circuits having the characteristic features described above which are easily employable by any user.

Another object of the present invention is to provide one-time programmable audio delivery circuits having the characteristic features described above which is comparatively inexpensive to obtain and employ.

Other and more specific objects will in part be obvious and will in appear hereinafter.

SUMMARY OF THE INVENTION

By employing the present invention, all of the difficulties and drawbacks previously encountered with prior art systems have been eliminated and an easily employed audio recording system is attained which is capable of being used by the consumer for recording perfected messages onto one or a plurality of one-time recordable audio generating modules. In accordance with the preferred embodiment of the present invention, a docking station is employed which is constructed to enable messages to be recorded, played, re-recorded, and then used when perfected to produce a high quality audio signal which is transferrable to a one-time programmable audio generating circuit/module. Furthermore, in the preferred construction, the docking station is small and compact, thereby providing complete portability thereto.

In this embodiment of the present invention, the docking station is constructed for receiving a one-time programmable audio producing module or circuit and transferring any desired message recorded on the docking station directly to the one-time programmable audio generating module. In this way, a particular message can be perfected by recording and re-recording the message onto the re-programmable circuit of the docking station and, once perfected, transferring the perfected message from the recording system of the docking station to the one-time programmable audio generating module incorporated in the circuit interconnected to the docking station.

Depending upon the use desired, the docking station of the present invention can be constructed for being interconnected with a single, one-time programmable audio generating module for enabling one module to be programmed as an individualized system for delivering a specific personalized message. Alternatively, the docking station of the present invention may also be constructed for receiving a plurality of one-time programmable audio generating modules for enabling the plurality of modules to receive the desired message simultaneously, thereby allowing a user to create a plurality of identical specialized messages for distribution to a wider audience. However, regardless of the number of modules being connected to the docking station or recorder system of the present invention, an important feature of this invention is the ability to record directly to a fully assembled audio generating module or circuit, as opposed to recording to only a chip. In this way, handling of the chip after recording is eliminated and post-recording assembly is avoided.

In an alternate embodiment, the system of the present invention may be implemented using a computer system in combination with an interface interconnected between the computer system and the one-time programmable, audio delivery modules. In this way, any person is able to employ a computer system for generating any desired message or pre-recorded sounds and transfer the message to one or more one-time programmable audio generating modules.

In a still further, alternate embodiment of the present invention, the portable, message recording/transferring system and docking station of the present invention is constructed for receiving a message from a computer and retaining the message in the recording/transfer system for later use. In this way, computers or CPUs may be employed for generating any desired message and having that message transferred to the recording/transfer system of the present invention.

Since the recording/transfer system and docking station is completely portable and easily transported to any desired location for engagement with a programmable chip or module, any message created on a computer/CPU is easily transferred onto one or more one-time programmable audio generating modules regardless of location of the modules. As result, a highly flexible easily employed system is realized which further enhances user access and implementation.

Another feature of the present invention is the incorporation of an interface for enabling the portable recording/transfer system of the present invention to be easily employed for transferring the prerecorded message onto one or a plurality of one-time programmable audio generating modules. In the preferred operation, a plurality of one-time programmable audio generating modules are retained in a single container, with the contacts to the module being exposed for easy interconnection.

By employing the interface of the present invention which interconnects between the programmable modules and the docking station, all of the modules in a single container are simultaneously engaged. Once engaged, the recording/transfer system of the present invention is mounted directly to the interface in order to enable the activation of the recorder/transfer system and the simultaneously recording of the desired message directly onto each of the one-time programmable audio generating modules interconnected to the interface.

In addition, in this preferred construction, the interface employed incorporates monitoring means, typically in the form of LEDs, which monitor the transmission of the message to each of the one-time programmable audio generating modules. In this way, a positive visual indicator is provided for showing when the message is being transferred as well as when any message has not been properly recorded. In this way, a user is able to simultaneously record a desired message onto a plurality of one-time programmable audio generating modules with complete assurance that each module receives the entire message desired.

Furthermore, the present invention enables the one-time programmable audio generating modules to receive a desired message as a fully assembled module, enabling the module to be immediately transported for use and/or assembly once the recording process is completed. As result, additional handling of recording chips and mounting of recording chips after a message has been placed thereon is completely eliminated.

The invention accordingly comprises the features of construction, combination of elements and arrangement of parts which will be exemplified in the construction hereinafter set forth and the scope of the invention will be indicated in the claims.

THE DRAWINGS

For a fuller understanding of the nature and objects of the invention, reference should be had to the following the detailed description taking in connection with the accompanying drawings, in which.

DETAILED DESCRIPTION

By reviewing FIGS. 1–13, along with the following detailed disclosure, the construction and operation of alternate preferred embodiments of the present invention can best be understood. However, as will become evident from this disclosure, further alternate embodiments can be implemented while still employing the teaching of the present invention. Consequently, it is to be understood that the embodiments disclosed herein, and shown in FIGS. 1–13 are merely for exemplary purposes and are not intended as a limitation of the present invention.

In accordance with the present invention, all of the prior art inabilities are eliminated by providing a portable re-programmable, audio recording and transferring system and docking station 20 which incorporates connector means 21. In the preferred construction, portable, re-programmable, audio recording/transferring system and docking station 20 incorporates record and review circuitry, enabling a user to record any desired audible message and review the message to be certain of its accuracy, completeness, and audio quality. If any element is lacking in the message as recorded, the message is erased and a new message is recorded in its place.

In the preferred construction of record/transfer system and docking station 20, high-quality, high production speed sound chips are employed to assure high fidelity audio generation. In this way, any desired message can be created, check, re-recorded, if necessary, and then transferred to the one-time programmable, audio generating circuit/module 22.

Figure 1:
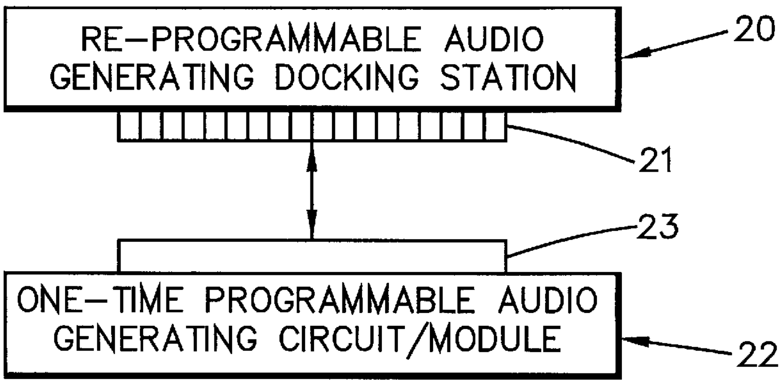
FIG. 1 is a schematic view of a portable, re-programmable, audio generating record/transfer system and docking station of the present invention in the process of being interconnected with a one-time programmable audio generating circuit/module of the present invention.

As depicted in FIG. 1, one-time programmable audio generating circuit/module 22 incorporates a connector 23 constructed for mating inter-engagement with connector 21 of record/transfer system and docking station 20. In this way, the physical interconnection of record/transfer system and docking station 20 and one-time programmable audio generating circuit/module 22 is easily achieved. In this way, the message recorded in the re-programmable audio record/transfer system and docking station 20 is easily transferred to one-time programmable audio generating module 22 whenever desired.

Furthermore, if the same message is to be recorded on additional one-time programmable audio generating module 22, the system depicted in FIG. 1 can be employed, with each additional module being connected to record/transfer system and docking station 20, in the manner detailed above, on an individual basis. Once interconnected, the desired message is transferred to one-time programmable audio generating module 22, with complete assurance that the same perfectly recorded message will be repeatedly transferred to any modules 22 desired by the user.

In addition, once one particular message is no longer desired, that message is easily erased from record/transfer system and docking station 20, and a new message recorded in its place. The new message is then checked for perfection and, once the message has been recorded in the precisely desired manner, the new message is ready to be transferred to any audio generating circuit/module 22 desired by the user.

Figure 2:
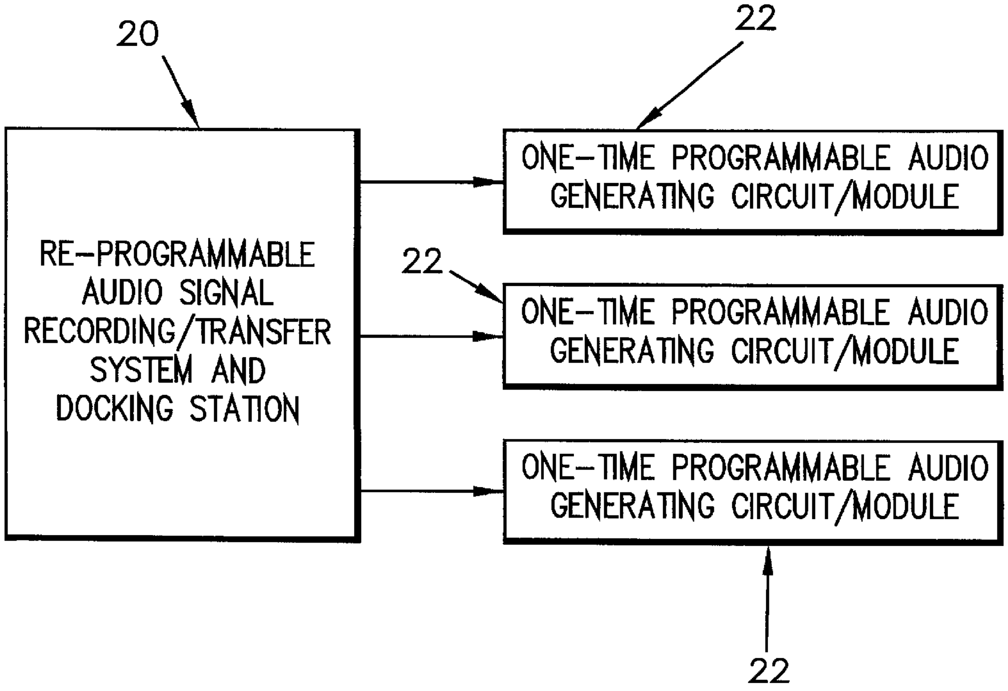
FIG. 2 is a schematic view of the portable, re-programmable, audio generating record/transfer system and docking station of the present invention diagrammatically shown interconnected with a plurality of one-time programmable audio generating circuit/modules.

In FIG. 2, an alternate construction of the present invention is depicted wherein re-programmable, audio recording/transferring system and docking station 20 is constructed for mating interconnection with a plurality of one-time programmable, audio generating circuit/modules 22. In this embodiment, any desired interconnecting system can be employed. However, in the preferred construction, mating electrical connectors 21 and 23 are employed, as depicted in FIG. 1, with record/transfer system and docking station 20 incorporating a plurality of connectors 21 for simultaneously being interconnected with a plurality of one-time programmable audio generating modules 22. In this embodiment, the plurality of one-time programmable audio generating modules 22 are simultaneously programmed from a single recorded message on record/transfer system and docking station 20.

By employing this embodiment of the present invention, benefits previously unattainable are now easily achieved by any individual or small business having the need to produce a plurality of audio generating circuits/modules having an identical message placed thereon. As a result, with ease and simplicity, the portable record/transfer system and docking station 20 of the present invention may be transported to any desired location for enabling the precisely desired message to be recorded onto the desired circuits/modules 22.

Once the message has been perfected, record/transfer system and docking station 20 is interconnected with a plurality of one-time programmable audio generating circuit/modules 22 desired by the user and, upon activation, the single message is automatically transmitted and recorded onto each of the one-time programmable audio generating circuit/modules 22 interconnected therewith. In this way, the creation of audio generating circuit/modules 22 by any individual or company can be achieved quickly and economically, enabling smaller companies to be able to provide products or services previously available only through large entities.

Figure 3:
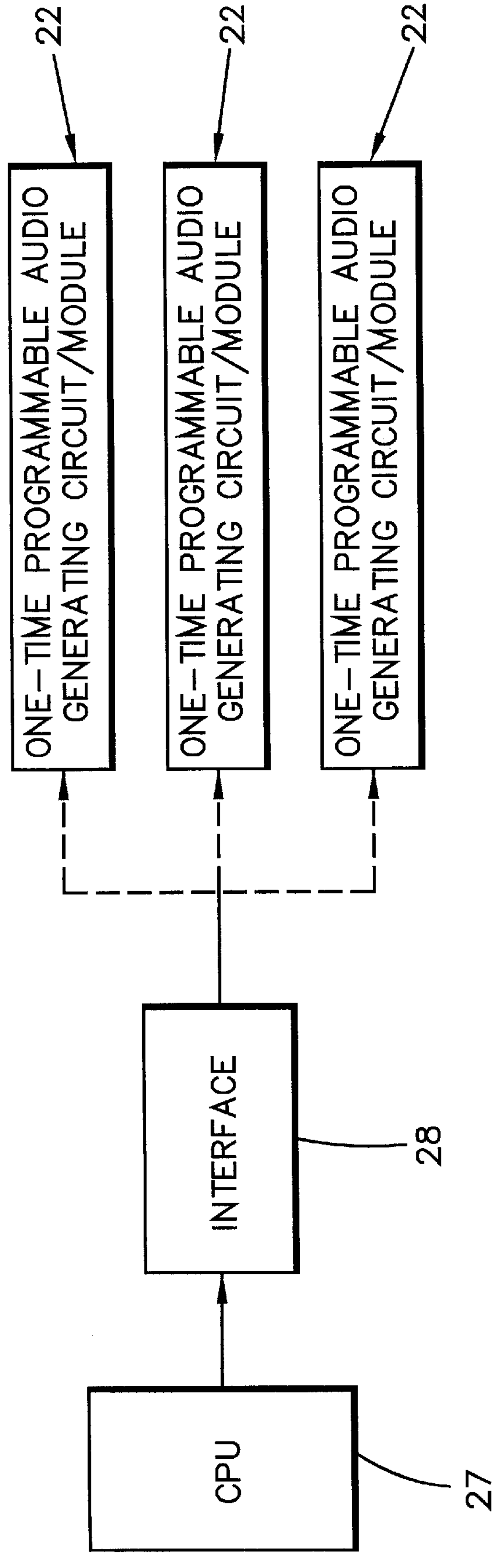
FIG. 3 is a schematic view depicting the interconnection of a computer with a plurality of one-time programmable audio generating circuit/modules of the present invention through a cooperating interface.

In FIG. 3, a further alternate embodiment of the present invention is diagrammatically represented. In this embodiment, a computer or CPU 27 is employed and directly interconnected with interface 28. In addition, one or a plurality of one-time programmable audio generating circuit/modules 22 are interconnected with interface 28, thereby enabling any desired message to be transferred to one-time module 22, when desired.

By employing this embodiment of the present invention, the user creates any desired message using computer or CPU 27. If desired, recorded compact discs having audio information thereon can be employed in creating the precisely desired message. Once created, the message is transferred from computer/CPU 27 through interface 28 to one-time programmable, audio generating circuit/modules 22.

Figure 4:
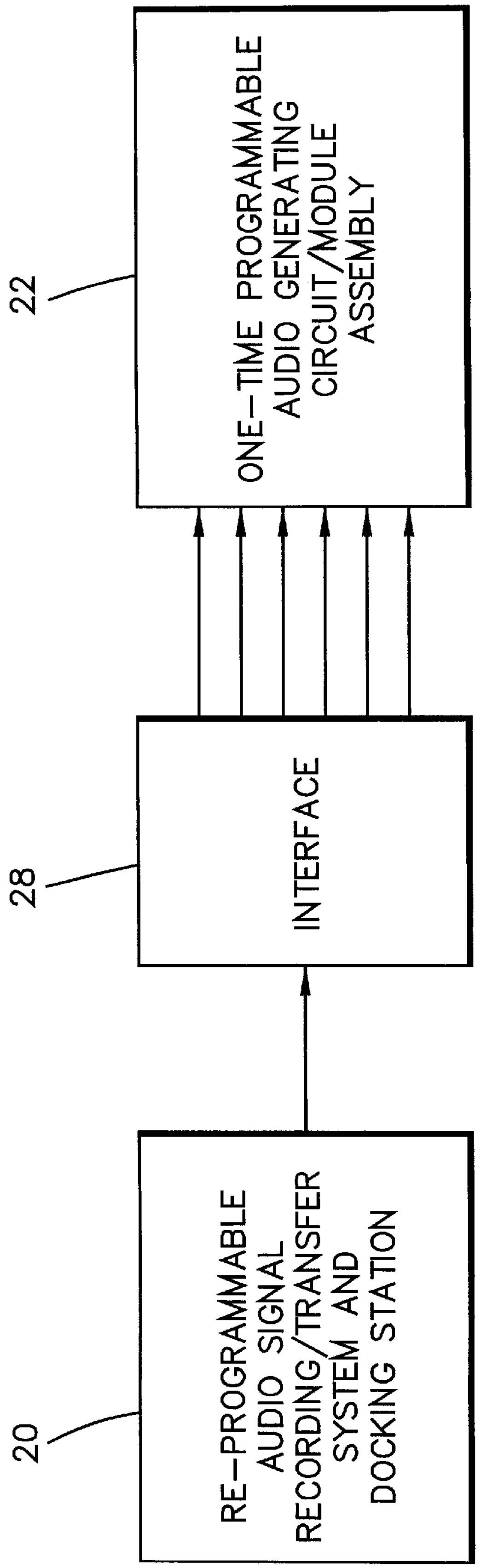
FIG. 4 is a schematic view of the portable, record/transfer system and docking station of the present invention diagrammatically shown interconnected to an interface which is interconnected to a plurality of one-time programmable audio generating circuit/modules.

A still further alternate embodiment of the present invention is depicted in FIG. 4. In this embodiment, portable re-programmable, audio single recording/transferring system and docking station 20 is interconnected with a single interface 28, with interface 28 being constructed for simultaneous interconnection and engagement with a plurality of one-time programmable audio generating circuit/modules 22. By employing this embodiment of the present invention, portable record/transfer system and docking station 20 of this invention is quickly and easily interconnected with an interface which has been previously mounted to a plurality of one-time programmable, audio generating circuit/modules 22 which are desired to be programmed simultaneously.

By employing this embodiment of the present invention, speed and efficiency are obtained and, is more fully detailed below, additional features for monitoring the audio transfer are preferably incorporated into interface 28 in order to further enhance the quality control of the system operation. As a result, the user is assured that each and every one-time programmable audio generating circuit/module 22 which is interconnected for programming will, in fact, have the precisely desired message accurately recorded thereon for use.

Figure 5:
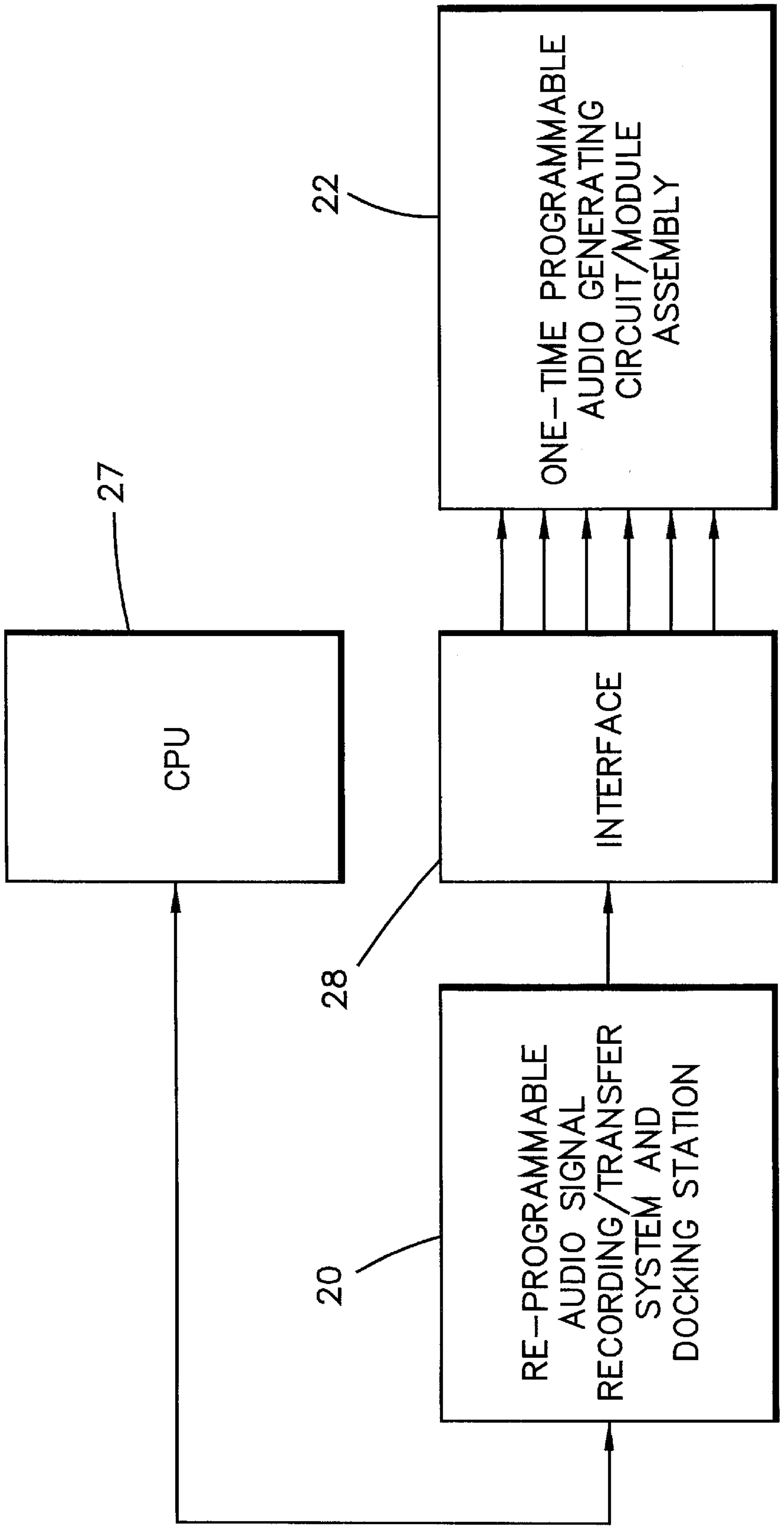
FIG. 5 is a schematic view depicting the system of FIG. 4 with a CPU shown connected to the record/transfer system and docking station.

In addition, as shown in FIG. 5, the embodiment of the present invention depicted and detailed above in reference to FIG. 4 may also be employed by interconnecting portable, audio signal recording/transferring system and docking station 20 to a computer or CPU 27 onto which the desired message has been recorded. As fully detailed below, the preferred embodiment of record/transfer system and docking station 20 enables both analog and digital input signals to be provided to the recording system.

As a result, a previously recorded message transmitted by a computer or CPU 27, or other external source, may quickly and easily be interconnected to record/transfer system and docking station 20 for receipt and recording thereon. Once the precisely desired message has been transmitted and retained by record/transfer system and docking station 20, the portable record/transfer system and docking station 20 can be moved to any desired location for interconnection with interface 28, or for direct interconnection to one-time programmable audio generating circuit/modules 22 as detailed above. As is evident from this disclosure, these various embodiments and applications of the present invention demonstrate the universatility and wide applicability of the present invention and the variety of methods that can be used for employing the teaching of this invention.

Figure 6:
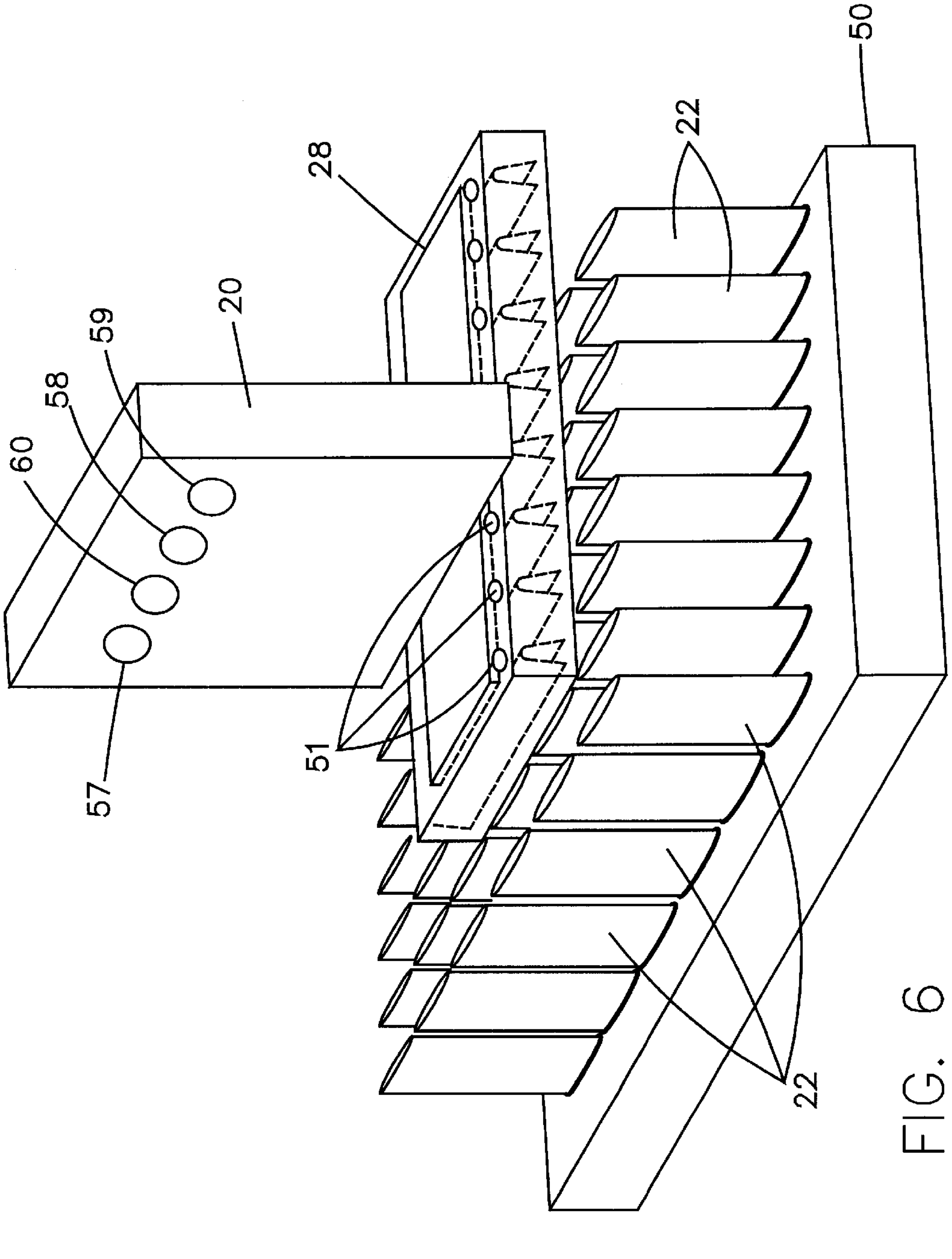
FIG. 6 is an exploded perspective view of the record/transfer system and docking station connected to an interface which is connected to a plurality of one-time programmable audio generating circuit/modules.

In FIG. 6, one embodiment of the present invention as schematically depicted in FIG. 4 is shown. In FIG. 6, programmable, audio generating record/transfer system and docking station 20 is shown telescopically disengaged from interface 28. In addition, a plurality of one-time programmable audio generating circuit/modules 22 are shown securely mounted in a vertically stacked array, side by side with each other, and retained in a tray or holder 50.

Holder 50 is typically employed by manufacturers of one-time programmable audio generating circuit/modules 22 for shipment. Typically, circuit/modules 22 are transported from a point of manufacture to a point of use by having them mounted in a vertically stacked, side to side relationship, as depicted in FIG. 6, with each circuit/module securely supported in tray 50 in juxtaposed, spaced, relationship to each adjacent circuit/module 22.

In addition, as depicted in FIG. 6, in accordance with the present invention, each circuit/module 22 is mounted in tray 50 with integrated connector 23 formed along the top edge of circuit/module 22, in order to enable engagement of connector 23 without removing circuit/module 22 from supporting tray 50. As a result, by employing this invention, a plurality of one-time programmable, audio generating circuit/modules 22 retained in a single tray 50 for transportation are never individually handled. Instead, the entire tray assembly is removed from the shipping container and interconnected with interface 28, which is constructed for direct, simultaneous engagement with each connector 23 of each circuit/module 22.

Once interface 28 is mounted to each circuit/module 22, as detailed above, record/transfer system and docking station 20 is mounted directly to interface 28. Once this connection is completed, the recording of the desired message, or the transfer of a previously recorded message can be quickly and easily achieved.

One of the features incorporated into interface 28 in the preferred embodiment of this invention is depicted in FIG. 6. As shown therein, interface 28 incorporates a plurality of LEDs 51 mounted on one surface thereof and positioned for ease of visibility by the user. In this preferred construction, each LED 51 is electrically connected to one circuit/module 22 for monitoring the transfer of the audio generating signal from record/transfer system and docking station 20 to circuit/module 22. In this regard, each LED 51 is typically illuminated when proper interengagement is achieved, while also providing a blinking signal during the transfer of the message from record/transfer system and docking station 20 to circuit/module 22. Finally, once the message has been fully and completely transferred to circuit/module 22, the LED will be illuminated continuously or, if desired, shut off.

Regardless of which visual indicator is employed for clearly showing proper recording of the message, the system is constructed for having the LED change color or flash in a particular manner to immediately inform the user that a particular circuit/module 22 did not receive the message in its entirety. In this way, the user is able to easily monitor the transmission of the desired audio message from record/transfer system and docking station 20 directly to circuit/module 22, with complete assurance that each and every circuit/module 22 has received the entire message. As a result, the user has complete assurance that each circuit/module 22 is fully functional and will perform as desired by the user. In addition, with LED 51 providing the identification of any bad circuit/module 27, any such circuit/module 22 which has not been recorded is easily removed and discarded, thereby eliminating the use of circuit/modules 22 which will not perform to the desired standards.

Figure 7A:
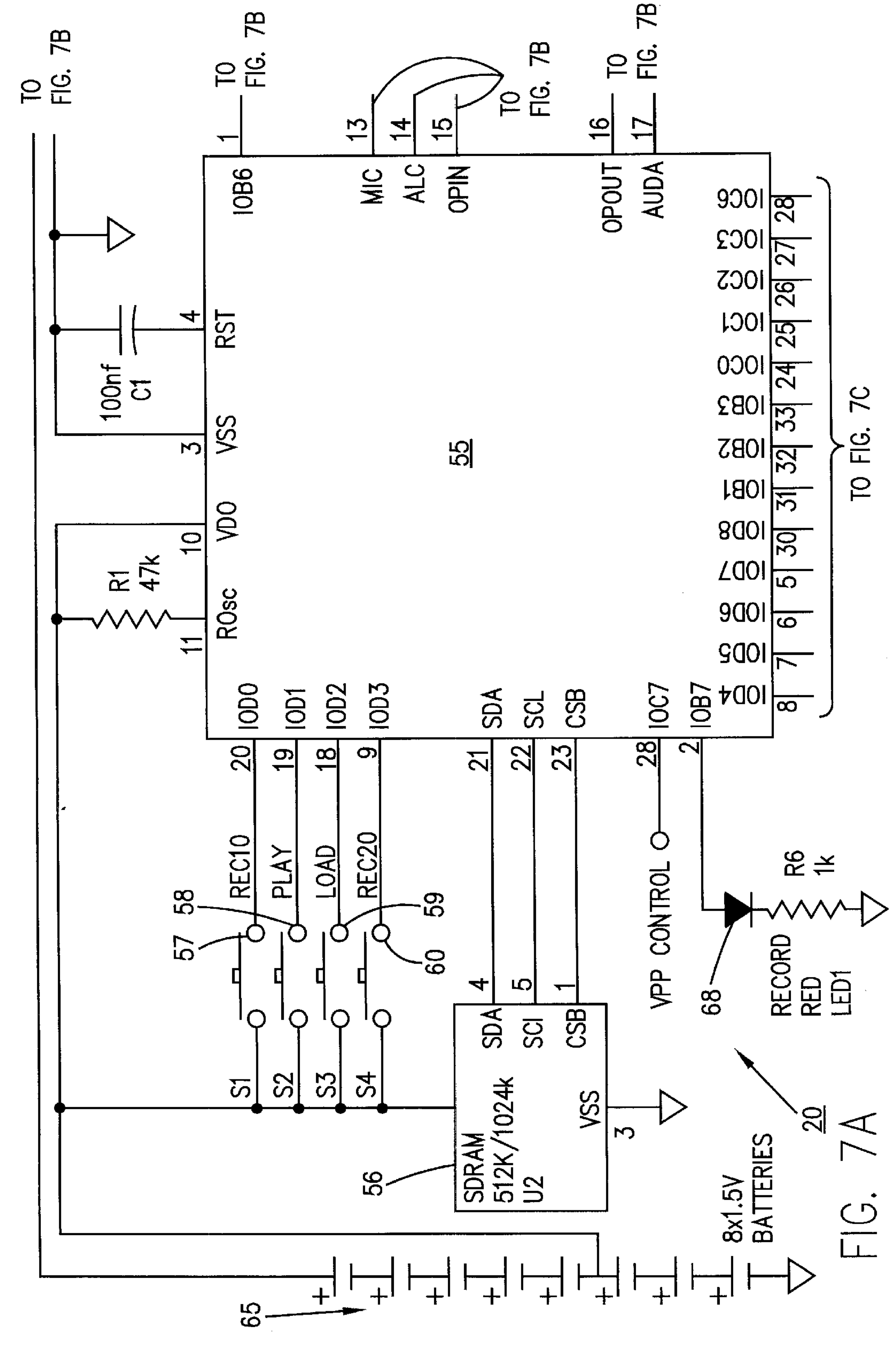
FIG. 7 is a schematic view of one embodiment for the electronic circuit for the record/transfer system and docking station.
Figure 7B:
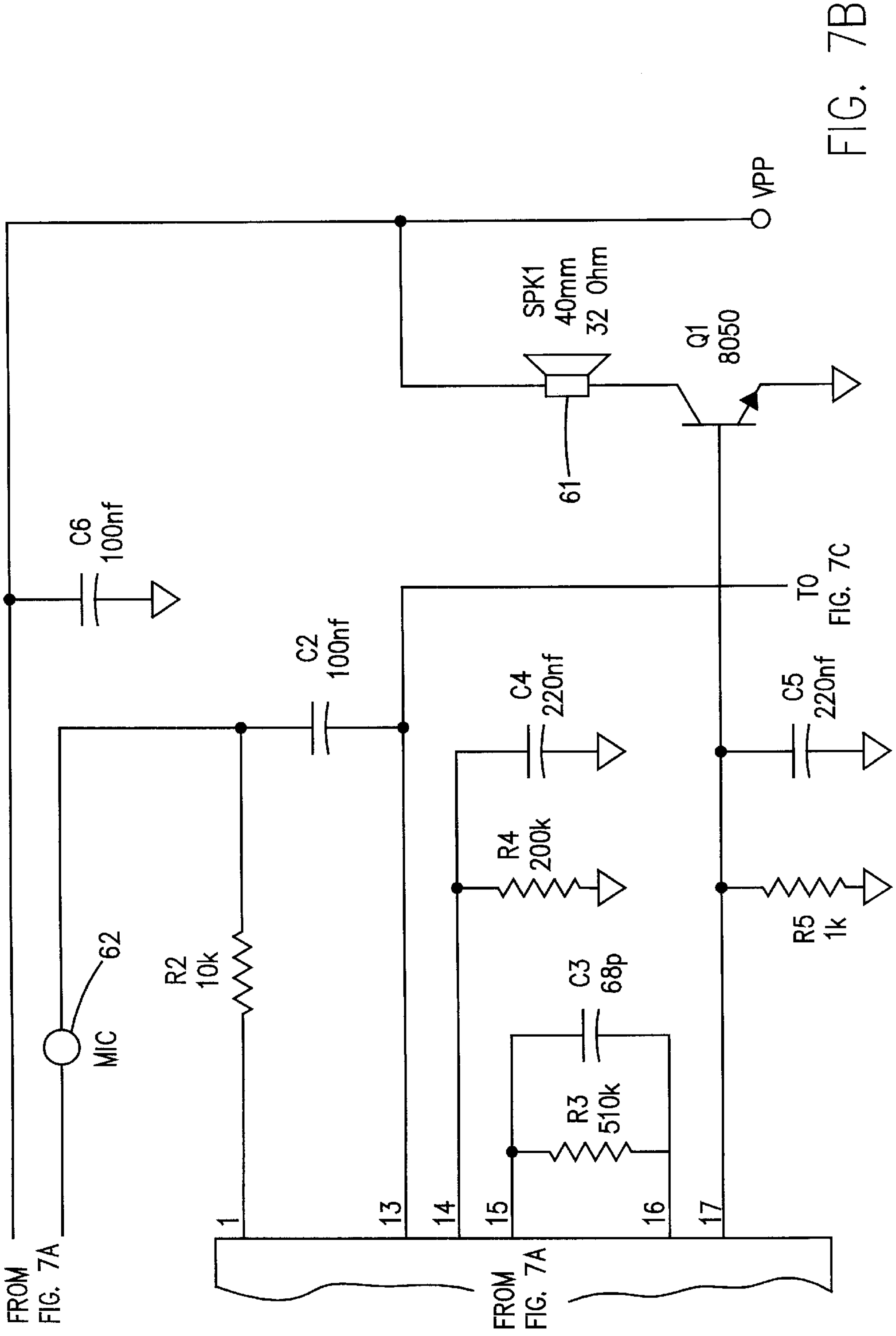
Figure 7C:
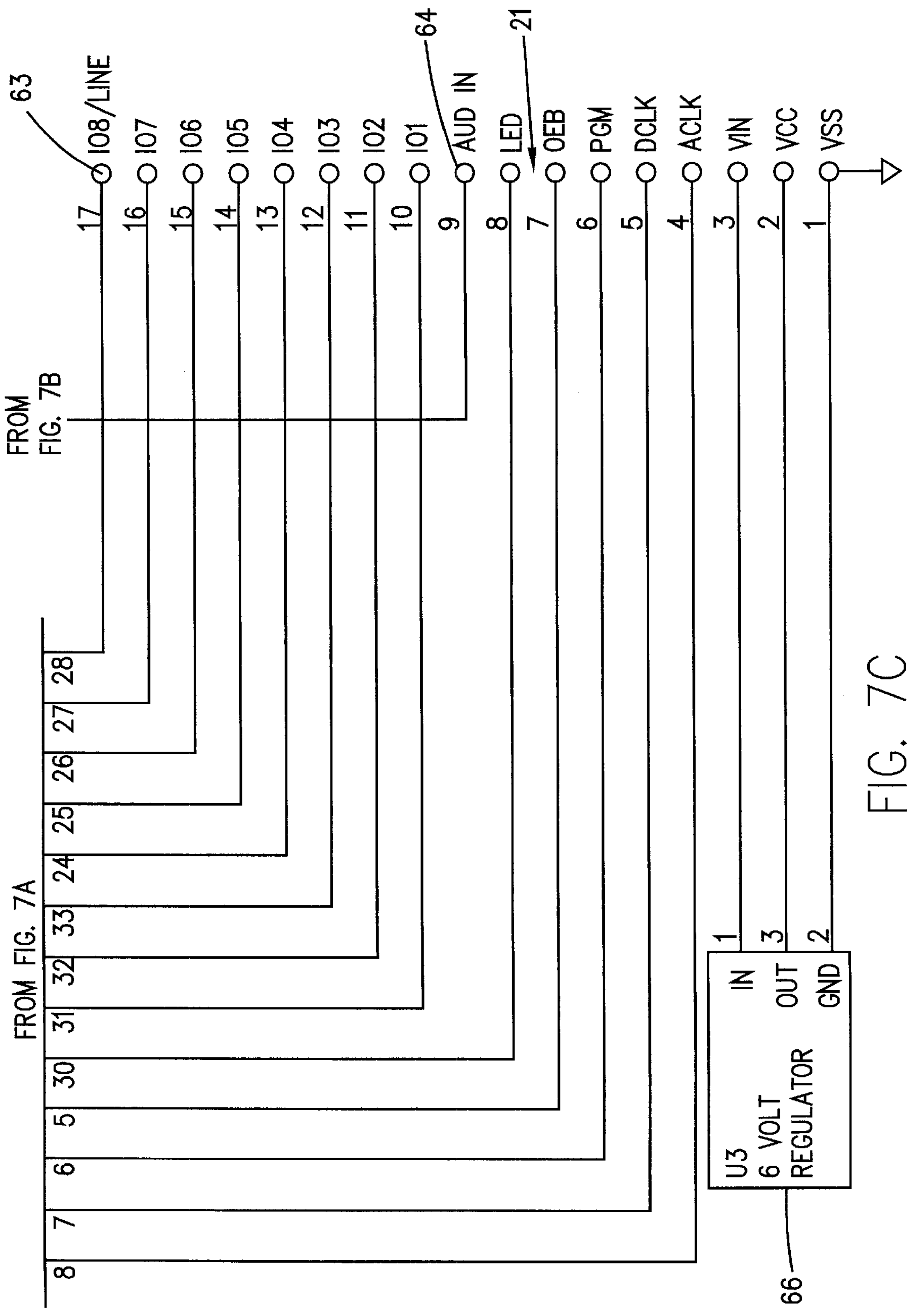

By referring to FIG. 7, along with the following detailed discussion, the construction and operation of one preferred circuit configuration for re-programmable, audio signal recording/transfer system and docking station 20 of the present invention can best be understood. As shown in FIG. 7 and discussed above, record/transfer system and docking station 20 preferably comprises a printed circuit board having a multi-pin connector 21, which enable rapid interengagement with interface 28 or with one or a plurality of one-time programmable audio generating circuit/modules 22. Regardless of which interconnection method is preferred by a particular user, the preferred circuitry of record/transfer system and docking station 20 is constructed for accommodating any particular configuration or interconnection method desired by the user.

In addition, in the preferred circuitry, as depicted in FIG. 7, record/transfer system and docking station 20 is constructed for receiving both analog and digital signals and storing the signal in a digital format for subsequent transmission to one-time programmable audio generating circuit/module 22. In order to provide the desired receipt of an audio signal, digitization of the audio signal, storage of the digitized audio signal and transmission of the stored signal when desired, the preferred embodiment of the circuitry for record/transfer system and docking station 20 incorporates integrated circuit 55 which is capable of providing all of the desired functions.

As depicted in FIG. 7, integrated circuit 55 preferably comprises a microprocessor which incorporates the circuitry to provide microphone amplification, digitization of the incoming signal and storage of a signal which is up to 20 seconds in length. In addition, various other features are also incorporated in integrated circuit 55. In this regard, the preferred model for integrated circuit 55 is clearly designated in FIG. 7. Although this particular model has been found to perform as desired and provide all of the requisite needs for record/transfer system and docking station 20, alternate comparable integrated circuits can be employed without departing from the scope of this invention.

Integrated circuit 55 preferably incorporates sufficient storage for enabling the desired digitized message to be recorded and retained. However, in order to assure retention and storage of the entire message without any degradation or difficulty, additional storage is provided by random access module 56. In this way, a user will have no difficulty in recording any desired message in its entirety, with ease and simplicity.

Other features incorporated into integrated circuit 55 are control means for enabling the desired activation of the integrated circuit 55 under the variety of circumstances to which record/transfer system and docking station 20 may be exposed. In this regard, switches 57, 58, 59, and 60 are preferably mounted to record/transfer system and docking station 20 with the switches connected to integrated circuit 55 at the appropriate contacts or input points. In the preferred construction, each of the switches 57, 58, 59 and 60 comprise push button switches which can be easily employed by the user.

In providing the user with the ability to satisfy most requirements and demands, the preferred construction employs switch 57 for recording a ten-second message, while switch 60 is employed for recording a twenty-second message. In addition, switch 58 is employed for activating the playing back mode for transmitting a recorded message through speaker 61. Finally, switch 59 is employed for activating integrated circuit 55 to transfer the recorded message to the one-time programmable audio generating circuit/modules 22 interconnected to record/transfer system and docking station 20.

As discussed above, in the preferred configuration, any desired audio signal can be transmitted to record/transfer system and docking station 20 using any one of three alternate input methods. These methods preferably comprise direct recording, analog signal inputs, or digital signal inputs. In providing for these three alternate audio signal delivery methods, microphone 62 is incorporated into record/transfer system and docking station 20 to provide the direct recording of any desired message. In addition, input 63 (pin 17) and input 64 (pin 9) cooperate to provide for the receipt of either an analog or digital signal and the transfer of that signal to integrated circuit 55.

In order to provide the user with ease of operation in recording and storing a desired message in integrated circuit 55, the microphone input is automatically selected by integrated circuit 55. However, whenever a connection is made to employ a direct analog signal or a direct digital signal, the microphone input pin is grounded to effectuate the activation of the external input pin connections.

In the preferred configuration, as briefly discussed above, the circuitry of record/transfer system and docking station 20 incorporates pin connector 21 which provides the desired input/output pins for enabling record/transfer system and docking station 20 to operate in the desired manner. Included in pin connector 21 are input/output pins 10–17, which enable the interengagement of up to eight separate and independent one-time programmable audio generating circuit/modules 22.

As detailed above, circuit/modules 22 may be connected directly to these input/output pins or connected thereto through interface 28. If a single circuit/modules 22 is connected to pin 10, the circuitry preferably comprises LED 68 to provide the desired indicator that the circuit/module 22 is properly connected and the message is properly transmitted thereto.

In order to provide record/transfer system and docking station 20 with the desired portability for ease of operation, power supply 65 is provided, preferably in the form of batteries. In addition, in order to assure sufficient battery power, as well as to be able to activate one-time programmable audio generating circuit/modules 22 connected thereto, record/transfer system and docking station 20 also incorporates a power regulator 66 which supplements the available power, as required. In this way, record/transfer system and docking station 20 is capable of enabling up to eight separate and independent one-time programmable circuit/modules 22 to be interconnected therewith, with each of the modules having sufficient power available for activation and operation during the message transfer process.

In the present invention, any desired format can be employed for digitally storing the audio signal in record/transfer system and docking station 20 as well as in one-time programmable audio generating circuit/modules 22. Although the embodiment depicted in FIG. 7 employs the ISSI compression method, any other audio compression or digital storing method or format known in the art can be employed with equal efficacy.

Figure 8:
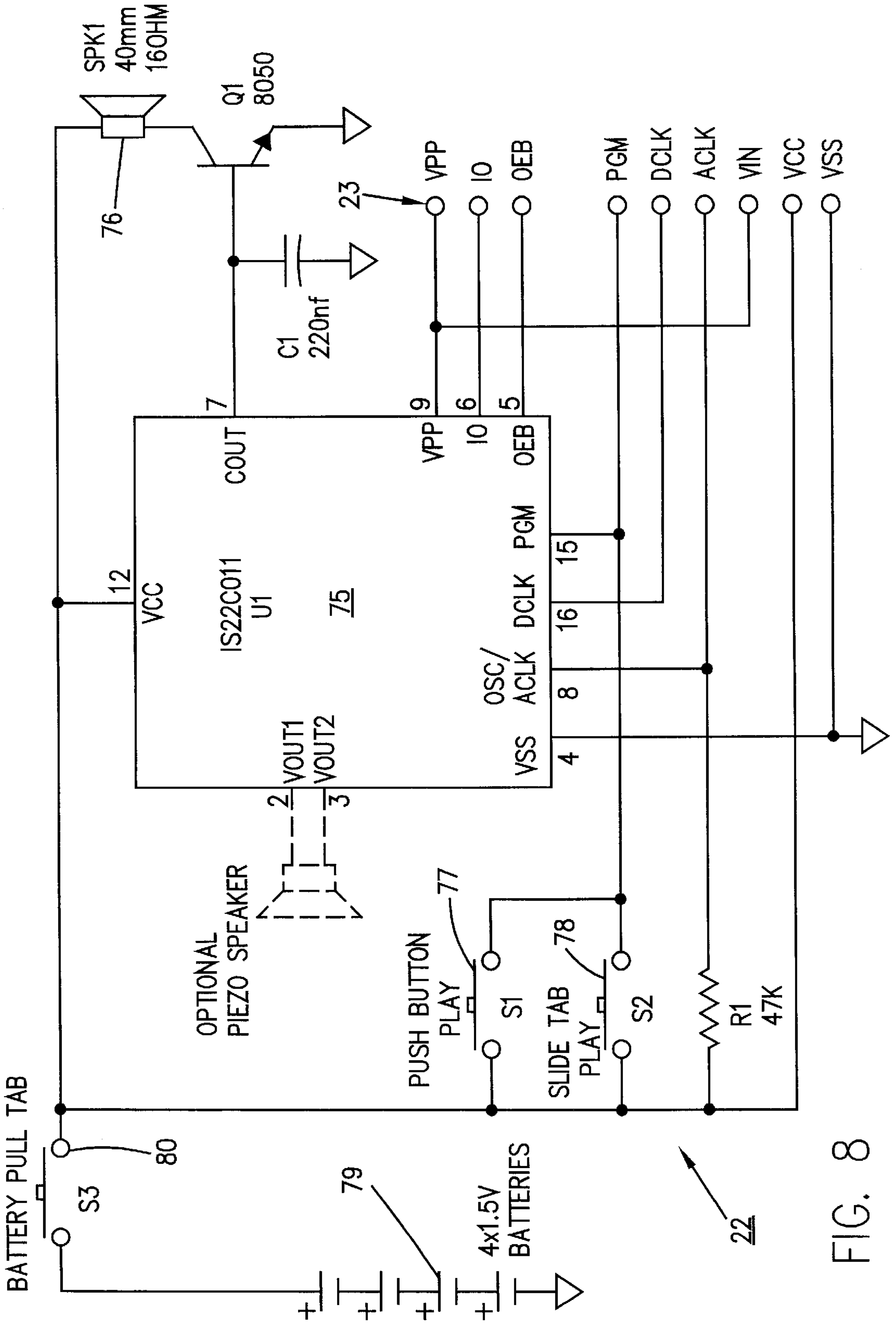
FIG. 8 is a schematic view of one embodiment of the electronic circuit for one-time programmable audio generating circuit/modules.

In FIG. 8, one preferred circuit construction for one-time programmable audio generating circuit/module 22 is depicted. In this embodiment, one-time programmable audio generating circuit/module 22 comprises a printed circuit board having multi-pin connector 23 which enables rapid interengagement with interface 28 or directly with record/transfer system and docking station 20. As detailed above, regardless of whether one or a plurality of circuit/modules 22 are connected to interface 28 or record/transfer system and docking station 20, the construction of circuit/modules 22 enables the transfer of the desired message to circuit/modules 22 for retention therein and replay whenever desired.

In this embodiment, circuit/module 22 comprises integrated circuit 75 which is constructed for providing complete compatibility with integrated circuit 55 of record/transfer system and docking station 20. In addition, integrated circuit 75 is constructed for receiving and retaining the digitized audio signal while being capable of transmitting the audio signal to speaker 76 when activated.

In order to enable circuit/modules 22 to be universally applicable in a wide variety of products or systems, circuit/modules 22 comprises activation switches 77 and 78. Switch 77 preferably comprises a push button switch for activating the play mode when pressed. Similarly, switch 78 is also a play activation switch but is constructed to be activated by sliding movement. By employing both switches 77 and 78 in circuit/module 22, either activation method can be employed by the user, thereby providing a greater variety of products within which circuit/modules 22 may be employed.

In order to assure that each circuit/module 22 is capable of operating when desired by the ultimate user or consumer, power means 79 are incorporated therein. Preferably, power means 79 are in the form of batteries. In addition, in order to preserve the power of batteries 79, switch 80 is incorporated in circuit/module 22.

In the preferred embodiment, switch 80 incorporates two contacts which are separated by a non-conducive pull tab. In this way, batteries 79 are not activated until the pull tab is removed, closing switch 80. As a result, batteries 79 remain inactive and unpowered, until integrated circuit 75 has received the precisely desired message and is being placed in a product for distribution. At that time, the pull tab is removed, allowing switch 80 to close and deliver the desired power to circuit/module 22.

Figure 9:
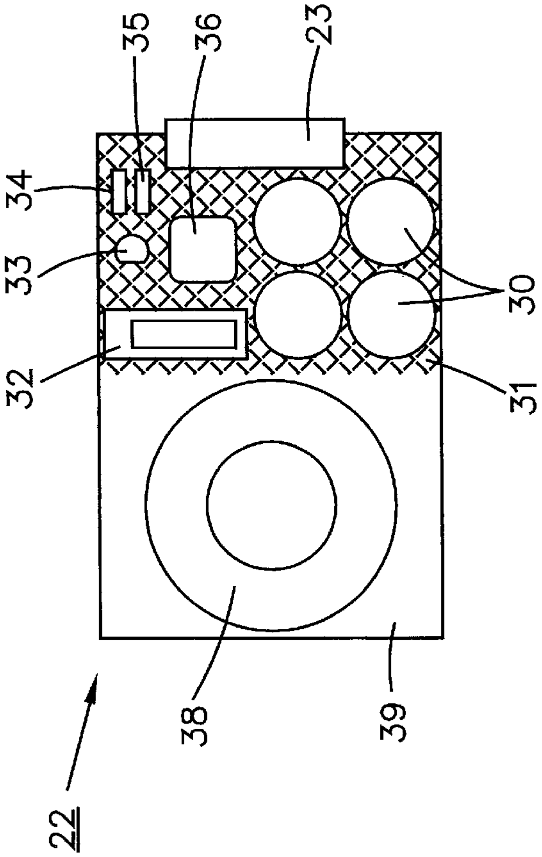
FIG. 9 is a top plan view of the circuit construction for a one-time programmable audio generating module assembly manufactured in accordance with the present invention.
Figure 10:
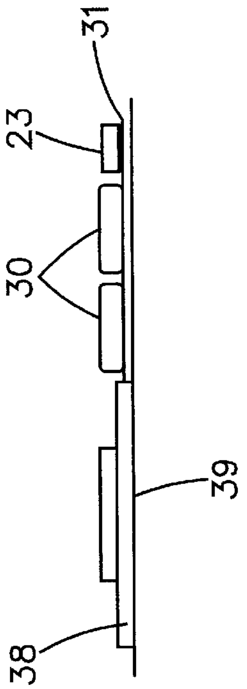
FIG. 10 is a side elevation view of the one-time programmable audio generating module assembly of FIG. 9.

As shown in FIGS. 9 and 10, another preferred circuit construction and layout of one-time programmable, audio generating circuit/module 22 of the present invention is fully detailed. As a shown therein, a plurality of batteries 30 are mounted to circuit board 31 along with switch trigger 32, transistor 33, resistors 34 and 35, integrated circuit 36, and connector 23. As discussed above, connector 23 is constructed and positioned for cooperative interengagement with connector 21 of re-programmable, audio generating record/transfer system and docking station 20. In addition, in order to produce the desired audio signal for being easily heard by an individual, speaker 38 is mounted to support panel 39, which completes the construction of module 22.

In this embodiment, connector 23 comprises a standard square pin socket type connector, which is cooperatively interengageble with a cooperating connector 21 formed on re-programmable, audio generating record/transfer and docking station 20. As is apparent, any desired similar connection means can be employed without departing from the scope of this invention. In addition, although alternate constructions can be employed, it is preferred that one-time programmable, audio producing module 22 incorporates a battery pull tab which is retained in place until the circuitry has received the precisely desired message. Then, the pull tab is removed for activating the playback function.

Figure 13:
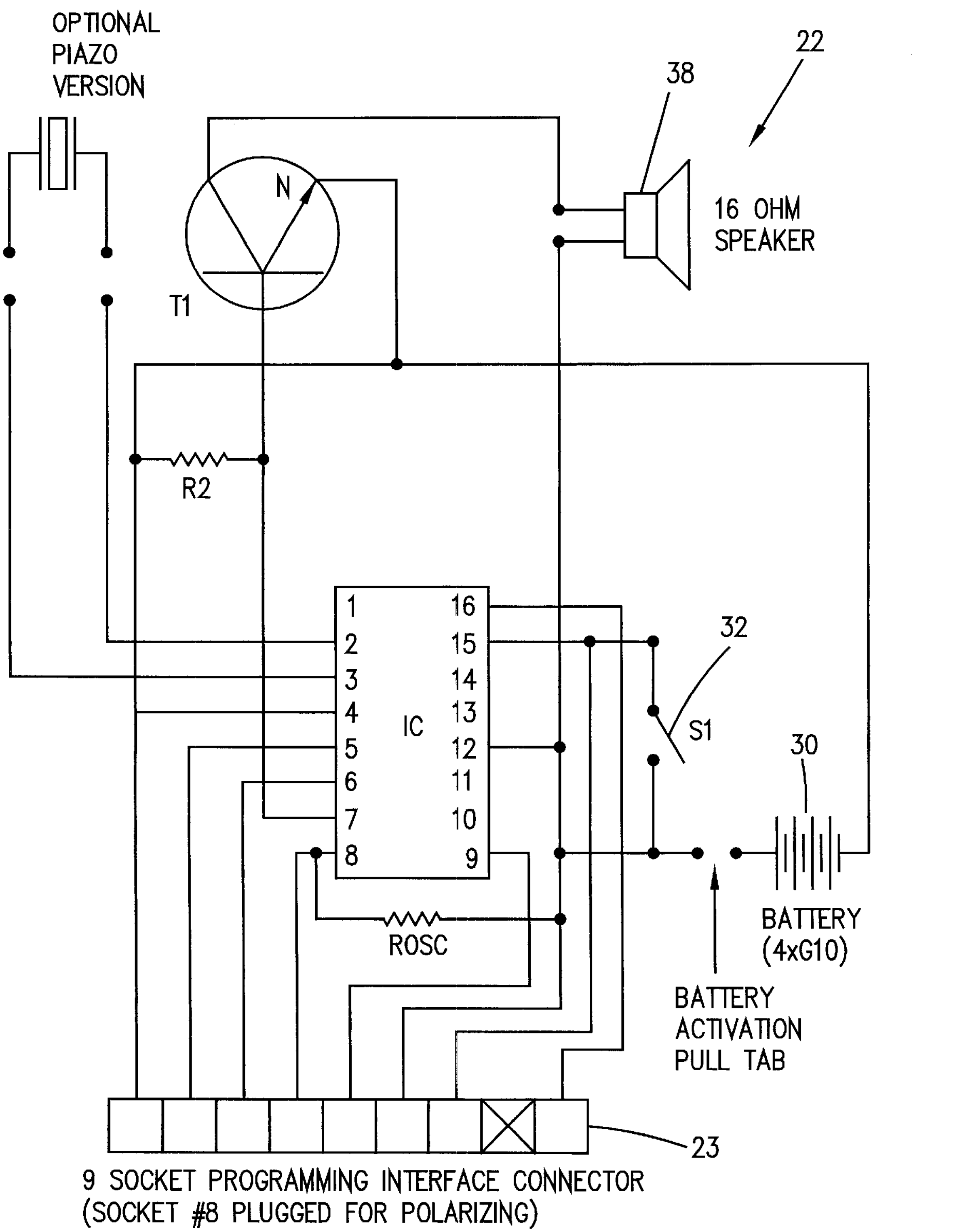
FIG. 13 is a schematic view of one electrical circuit of the one-time programmable, audio generating circuit/module of FIG. 9.

In FIG. 13, a circuit diagram for one-time programmable audio generating circuit/module 22 is depicted. In addition, although alternate constructions and pin connections can be employed, Table 1 details the preferred pin connections used for integrated circuit 36 in module 22. By employing these disclosures, the construction and operation of the preferred embodiment of the present invention is readily apparent.

TABLE 1

| Pin No. | Pin Name | Normal Operation | Programming Mode |
|---|---|---|---|
| 1 | LED1 | O/P | — |
| 2 | VOUT1 | O/P | — |
| 3 | VOUT2 | O/P | — |
| 4 | VSS | POWER(0 V) | POWER (0 V) |
| 5 | STP/OEB | O/P | I/P |
| 6 | LED2/IO | O/P | I/O |
| 7 | COUT | O/P(note 4) | — |
| 8 | OSC/ACLK | I/P(note 2) | I/P |
| 9 | VPP | — | POWER (12 v) |
| 10 | S1 | I/P | — |

TABLE 1-continued

| Pin No. | Pin Name | Normal Operation | Programming Mode |
|---|---|---|---|
| 11 | S2 | I/P | — |
| 12 | VDD | POWER (5 v) | POWER (5 v) |
| 13 | S3 | I/P | — |
| 14 | S4 | I/P | — |
| 15 | SBT/PGM | I/P | I/P |
| 16 | IRP/DCLK | I/P | I/P |

Pins 1, 2, 3, 7, 10, 11, 13 and 14 will not be used during voice programming. External components can be connected to these pins before programming.

Pin 4 and 12 are power supply. To program the OPT chip with the module batteries inserted, a pull tab will be used to prevent the batteries from being overcharged by the power supply of the IVR programmer.

Pins 5 and 6 are output pins when the chip is in normal operation mode but they are input pins during voice programming. No external components can be connected to these pins. None are required for this application.

Pin 8 will be connected to a large value resistor in normal playback mode operation. There will be no problem with this resistor during programming.

Pins 15 and 16 are input pins during normal and programming modes. The switch trigger will be connected to these pins for normal playback operation. As long as this switch remains open during programming, there is no problem.

If desired, the construction and operation of portable, re-programmable, audio generating record/transfer system and docking station 20 of this invention can be substantially identical to the construction depicted in FIGS. 9 and 13 for module 22. The principal difference in the construction of portable, re-programmable, audio generating record/transfer system and docking station 20 and one-time programmable, audio generating circuit/module 22 is the incorporation of higher quality components and reprogrammable audio circuitry. However, these variations are readily apparent to one having ordinary skill in the art, enabling record/transfer system and docking station 20 in accordance with the present invention to be achieved from the foregoing disclosure.

Furthermore, in the construction of portable, reprogrammable, audio generating record/transfer system and docking station 20, as depicted in FIG. 2, wherein a single desired message is simultaneously transferred to a plurality of one-time programmable audio generating modules 22, a high-quality, high speed production multiple module programmer is employed. This construction would incorporate the use of master sound chips, preferably in the DIP format, for allowing the multiple programming to be achieved at very high speeds. By employing this type of construction, the desired operation and quality audio generation and transmission are realized.

Figure 11:
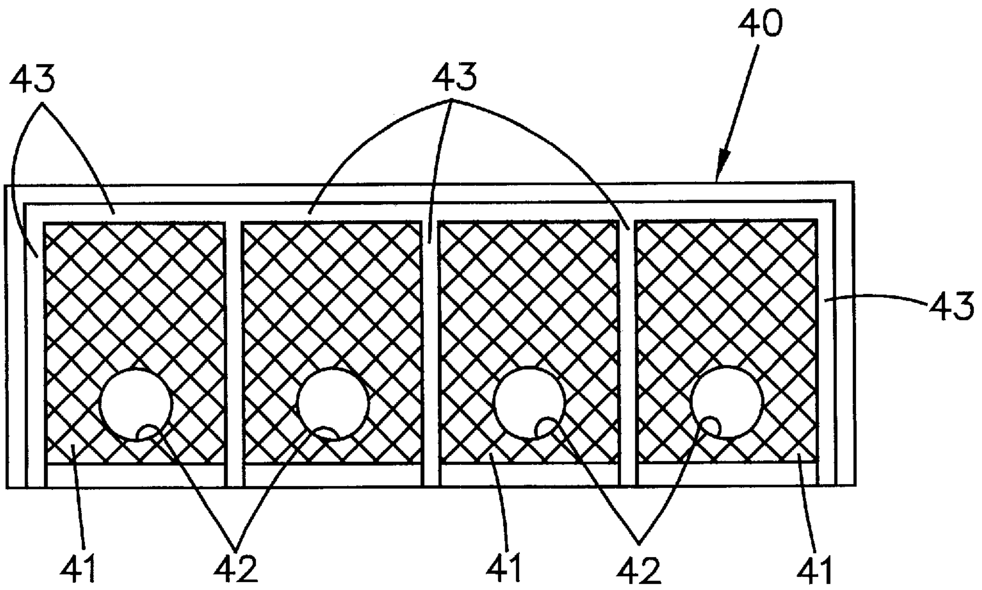
FIG. 11 is a top plan view of a holder system for a plurality of one-time programmable, audio generating modules.
Figure 12:
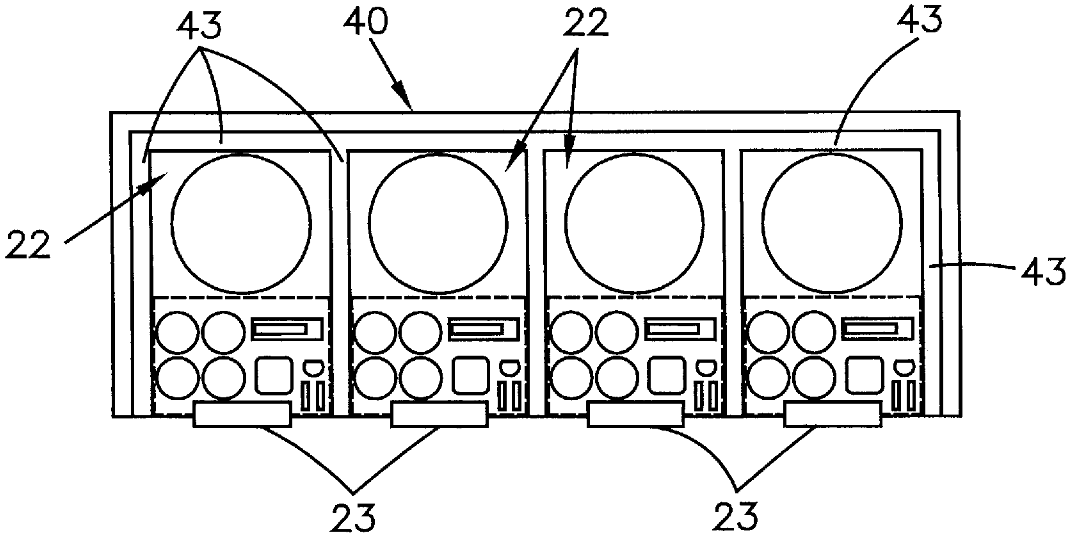
FIG. 12 is a top plan view of the holder system of FIG. 11 depicted with a plurality of one-time programmable, audio generating modules of FIG. 9 mounted in place.

In addition to the embodiment detailed above, another embodiment which enables a user to easily handle and transport one-time programmable, audio generating modules 22 of the present invention is the use of holder or carrier 40, as depicted in FIGS. 11 and 12. As shown therein, carrier 40 incorporates a plurality of receiving zones of 41 which are constructed for receiving and retaining modules 22 therein. In the preferred construction, each receiving zone 41 is defined by upstanding wall or flange 43 which peripherally surrounds each zone 41 on three adjacent sides thereof, effectively defining the overall size and shape of zone 41.

As shown in FIGS. 11 and 12, flange 43 defines zones 41 with a size and shape which enables module 22 to be securely retained in zone 41 by frictional engagement with flange 43. By employing this preferred construction, a module 22 is quickly and easily positioned in zone 41 and locked in place by frictionally engaging the side edges of module 22 with flange 43.

In addition, as shown in FIG. 12, module 22 is preferably oriented in zone 41 with connector 23 placed along the open edge of zone 41, the edge having no flange, thereby allowing connector 23 to be easily accessed. In this way, a plurality of modules 22 are interconnectable with record/transfer system and docking station 20 for receiving the desired message, without requiring removal of module 22 from carrier 40.

In addition, in the preferred construction, an aperture 42 is formed at the base of each receiving zone 41 adjacent the open edge thereof. By incorporating an aperture 42 in each zone 41, any module 22 retained in zone 41 may be easily removed by dislodging module 22 from holding zone 41 using a displacement force applied through aperture 42.

It will thus be seen that the objects set forth above, among those made apparent from the preceding description, are efficiently attained and, since certain changes may be made in the above article without departing from the scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desired to secure by Letters Patent is:

1. An audio message recording and duplicating system for enabling a perfected message to be recorded and then transferred onto an audio generating circuit/module for being replayed when activated, said recording and duplicating system comprising:

A. a re-recordable audio receiving and producing member
   a. constructed for enabling any desired audio message to be recorded thereon, and
   b. enabling the review, deletion and re-recording of any message as desired by the user;
B. first connector means mounted to the audio receiving and producing member for enabling at least one audio generating circuit/module to be interconnected therewith;
C. transmission means connected to the re-recordable audio receiving/producing member and constructed for receiving the audio message therefrom and transmitting the audio message to the first connector means when desired by the user; and
D. a separate and independent audio generating circuit or module
   a. constructed for receiving the audio message stored in the re-recordable audio receiving and producing member and storing the identical audio signal or message therein,
   b. generating the audio signal/message when activated, and
   c. incorporating a second connector constructed for mating engagement with the first connector means and enabling the receipt and transfer of the audio message from the audio receiving/producing member to the audio generating circuit/module for storage in said audio generating circuit/module, whereby any desired audio message may be recorded and perfected on the re-recordable audio receiving/producing means and, once perfected, transferred to the audio generating circuit/module for being played whenever desired.

2. The audio recording system defined in claim 1, wherein said audio generating circuit/module comprises a one-time programmable, audio generating circuit/module.

3. The audio recording system defined in claim 2, wherein said audio generating circuit/module comprises audio storage means formed therein for receiving, recording and retaining an audio message for playback when activated.

4. The audio recording system defined in claim 1, wherein the re-recordable audio receiving and producing means comprises one selected from the group consisting of a computer, a central processing unit and a separate standalone unit.

5. The audio recording system defined in claim 4, wherein the docking station and the first connecter means comprises an interface member.

6. The audio recording system defined in claim 1, wherein the audio generating circuit/module is defined as comprising:

A. an integrated circuit formed in a supporting circuit board and incorporating electronic components for receiving and storing an audio signal and re-playing the audio signal in response to receipt of an activation signal;
B. a switch member for producing an activating signal to cause the circuit to produce the stored audio signal;
C. power means connected to the circuit for enabling the circuit to be activated; and
D. a second connector formed on the circuit board and interconnected to the electronic components for enabling the electronic interconnection thereof.

7. The audio message recording and duplicating system defined in claim 1, wherein said first connector means is further defined as comprising a plurality of pin receiving zones for enabling the rapid engagement therewith of one selected from the group consisting of a single audio generating circuit/module and a plurality of audio generating circuits/modules.

8. The audio message recording and duplicating system defined in claim 1, wherein the re-recordable audio receiving and producing member comprises a microprocessor constructed for receiving analog and digital audio messages and recording and storing said audio messages in a digital format.

9. The audio message recording and duplicating system defined in claim 8, wherein the re-recordable audio receiving and producing member incorporates a plurality of switch means for enabling audio messages of different time intervals to be designated and recorded.

10. The audio message recording and duplicating system defined in claim 1, wherein said re-recordable audio receiving and producing member comprises a first switch for initiating the transfer of a recorded message to the audio generating circuit/module and a second switch for enabling playback of a recorded message.

11. An audio message recording and duplicating system for enabling a perfected message to be recorded onto an audio generating circuit/module for being replayed when activated, said recording and duplicating system comprising:

A. a re-recordable audio receiving and producing member
   a. constructed for enabling any desired audio message to be recorded thereon, and b. enabling the review, deletion and re-recording of any message as desired by the user;

B. first connector means mounted to the audio receiving and producing member and constructed for enabling a plurality of separate and independent audio generating circuits/modules to be simultaneously mounted therein and be interconnected therewith;

C. transmission means connected to the re-recordable audio receiving/producing member and constructed for receiving the audio message therefrom and simultaneously transmitting the audio message to the first connector means and to each of the plurality of audio generating circuits/modules when desired by the user; and D. a plurality of separate and independent audio generating circuits or modules, each being a. constructed for receiving and storing an audio signal or message, b. generating the audio signal/message when activated, and c. incorporating a second connector constructed for mating engagement with the first connector means and enabling the receipt and transfer of the audio message from the audio receiving/producing member to the audio generating circuit/module;

whereby any desired audio message may be recorded and perfected on the re-recordable audio receiving/producing member and, once perfected, transferred to the plurality of audio generating circuits/modules for being stored therein in a single operation.

12. The audio message recording and duplicating system defined in claim 11, wherein each of said audio generating circuits/modules comprise a one-time programmable, audio generating circuit/module.

13. The audio message recording and duplicating system defined in claim 12, wherein each of said audio generating circuits/modules comprises audio storage means formed therein for receiving, recording and retaining an audio message for playback when activated.

14. The audio message recording and duplicating system defined in claim 11, wherein each of the plurality of audio generating circuits/modules is defined as comprising:

A. an integrated circuit formed in a supporting circuit board and incorporating electronic components for receiving and storing an audio signal and re-playing the audio signal in response to receipt of an activation signal;

B. a switch member for producing an activating signal to cause the circuit to produce the stored audio signal;

C. power means connected to the circuit for enabling the circuit to be activated; and D. a second connector formed on the circuit board and interconnected to the electronic components for enabling the electronic interconnection thereof.

15. The audio message recording and duplicating system defined in claim 11, wherein the plurality of audio generating circuits/modules are mounted in a support member with each audio generating circuit/module positioned in juxtaposed, spaced relationship to an adjacent audio generating circuit/module, with the second connector each audio generating circuit/module being positioned for ease of access and engagement with the first connector.

16. The audio message recording and duplicating system defined in claim 15, wherein said support member is further defined as comprising, at least in part, a shipping container for said plurality of audio generating circuits/modules.

17. The audio message recording and duplicating system defined in claim 15, wherein said second connector is defined as being mounted to the top edge of each audio generating circuit/module.

18. The audio message recording and duplicating system defined in claim 15, wherein said support member comprises a substantially flat panel construction for receiving and retaining the plurality of audio generating circuits/modules therein by peripherally surrounding each module on three of its four side edges, with the free edge incorporating the second connector.

19. The audio message recording and duplicating system defined in claim 15, wherein said system further comprises an interface constructed for engaging with the first connector of the audio receiving and producing member and for simultaneously engaging with the second connector of each of the plurality of audio generating circuits/modules, whereby the message retained on the audio receiving and producing member is simultaneously transferred to each of the plurality of audio generating circuits/modules.

20. The audio message recording and duplicating system defined in claim 19, wherein said interface is further defined as comprising a separate and independent LED positioned in association with each of the plurality of audio generating circuits/modules, and constructed for monitoring and providing a visual indication of the progress and completion of the transfer of the desired message from the re-recordable audio receiving and producing member to the associated audio generating circuit/modules.

21. An audio message recording and duplicating system for enabling a perfected message to be recorded and then transferred onto an audio generating circuit/module for being replayed when activated, said recording and duplicating system comprising:

A. a re-recordable audio receiving and producing member constructed for enabling any desired audio message to be recorded thereon, and enabling the review, deletion and re-recording of any message as desired by the user, said re-recordable audio receiving and producing member comprising:

a. a microprocessor constructed or receiving analog and digital audio messages and recording and storing said audio messages in a digital format;

b. a first switch for initiating the transfer of a recorded message to an audio generating circuit/module and a second switch for enabling playback of a recorded message; and c. at least a third switch and a fourth switch for enabling audio messages of different time intervals to be designated and recorded;

B. first connector means mounted to the audio receiving and producing member for enabling at least one audio generating circuit/module to be interconnected therewith;

C. transmission means connected to the re-recordable audio receiving/producing member and constructed for receiving the audio message therefrom and transmitting the audio message to the first connector means when desired by the user; and D. a separate and independent audio generating circuit or module a. constructed for receiving the audio message stored in the re-recordable audio receiving and producing member and storing the identical audio signal or message therein, b. generating the audio signal/message when activated, and c. incorporating a second connector constructed for mating engagement with the first connector means and enabling the receipt and transfer of the audio message from the audio receiving/producing member to the audio generating circuit/module for storage in said audio generating circuit/module, whereby any desired audio message may be recorded and perfected on the re-recordable audio receiving/producing means and, once perfected, transferred to the audio generating circuit/module for being played whenever desired.

* * * * *